UNITED STATES PATENT OFFICE.

SAMUEL P. SADTLER, OF PHILADELPHIA, PENNSYLVANIA, AND JOHN HENRY GRIMM, OF WILMINGTON, DELAWARE; SAID GRIMM ASSIGNOR TO WILLIAM W. SKIDDY, OF STAMFORD, CONNECTICUT.

LICORICE EXTRACT AND PROCESS OF MAKING SAME.

SPECIFICATION forming part of Letters Patent No. 495,271, dated April 11, 1893.

Application filed June 13, 1891. Renewed July 26, 1892. Again renewed February 9, 1893. Serial No. 461,685. (No specimens.)

*To all whom it may concern:*

Be it known that we, SAMUEL P. SADTLER, a resident of Philadelphia, Pennsylvania, and JOHN HENRY GRIMM, a resident of Wilmington, Delaware, citizens of the United States, have invented certain Improvements in Licorice-Extract Manufacture, of which the following is a specification.

The object of our invention is to produce a licorice extract or paste, which is readily and perfectly soluble in water or other solvent, and which possesses, in a high degree, the resinous luster desirable in such products.

In the manufacture of licorice extracts in the ordinary way, by making a decoction or infusion by boiling the root in water, the boiling operation must be continued for such a time in order to insure a complete extraction of the valuable principles of the root, that a great deal of starch is extracted. Hence when the thin liquors obtained in the successive extractions are evaporated in the evaporating pan, there is left a solid extract, which, because of the excessive amount of starchy material contained therein, is devoid of the resinous luster desired for licorice extracts, is not perfectly soluble, and is liable to develop a mold and to crack in drying. We have discovered that we can overcome these difficulties, and are enabled to produce a superior product of fine luster, which has a pleasant taste and is also readily soluble, by converting the starch of the thin extraction liquor into soluble products and then evaporating the liquor in a vacuum pan in the usual manner.

In carrying out our process we use by preference an infusion of malt, taking advantage of the power of the diastase of the malt to convert the starch into maltose and dextrine, both soluble products, but we may use other soluble ferments having in common with the diastase of malt the property of breaking up the starch into soluble elements.

In carrying out our process we prefer to operate in the following manner:—In the first place we prepare an infusion of crushed malt, using either green or dried malt, although we obtain a greater diastatic activity from the former. The malt is treated first with water at the ordinary temperature for an hour with an occasional stirring, and the mixture is then brought to a temperature from about 120° to 140° Fahrenheit for half an hour longer and then filtered. This filtered infusion, freshly prepared, we add in successive portions to the extraction liquors, which may vary from 5° to 20° Baumé in strength, and which are preferably kept at a temperature not exceeding 140° Fahrenheit noting the progress of the reaction which ensues by testing samples of the liquor at intervals for starch by the iodine test. When a drop of the liquor diluted with water no longer gives the blue color of iodide of starch, but instead the red color due to the combination of dextrine with starch, the addition of the infusion of malt is stopped, although the liquors are kept at 140° Fahrenheit for some time longer in order to allow the dextrine to gradually go over into maltose, which product is, in some respects, preferred to the dextrine, although both are soluble and free from the objections before mentioned as pertaining to the starch originally present. The liquors are then allowed to settle and a fine sediment separates out. This sediment is formed by the combination of the tannin which was contained in the extraction liquors, and the coagulated albuminoids of the malt infusion, and is removed by running the contents of the treating tank through a large filter press, and the filtered liquor is then run into a vacuum pan for concentration. The removal of this sediment improves distinctly the taste of the extract because the astringent tannin which gives a bitter taste to the extract is thus gotten rid of, and at the same time its removal leaves the extract perfectly clear and easily soluble. While these steps of precipitation and filtration are preferable they are not absolutely necessary in all cases.

The product obtained by our process has the rich mahogany brown color so much prized by the trade, and has also a rich resinous luster, and is as before stated free from the bitterness which the tannin ordinarily gave to extracts made prior to our invention. It is much superior to the licorice extract manufactured in the old way, as it is immediately and perfectly soluble in water, as the objectionable starchy ingredient has been replaced by a perfectly soluble and sweet tasting mixture, viz: maltose and dextrine.

We claim as our invention—

1. An improved licorice extract consisting of licorice, maltose and dextrine.

2. An improved licorice product consisting of licorice extract, in which the starch has been converted into a soluble element or elements, substantially as described.

3. An improved licorice product, consisting of licorice extract retaining its glycyrrhizin but free from tannin substantially as specified.

4. The process herein described of making a soluble licorice extract, said process consisting in subjecting the extraction liquor to the action of a soluble ferment whereby the starch in said liquor is converted into soluble elements, substantially as described.

5. The process herein described of making a licorice extract, said process consisting in transforming the starch of the extraction liquor into maltose and dextrine by subjecting said liquor to the action of diastase of malt, substantially as specified.

6. The process herein described of manufacturing a soluble licorice extract, said process consisting in first preparing an infusion of malt, adding said infusion to the extraction liquor, and when the samples of said liquor show dextrine, stopping the addition of the infusion still keeping the liquor at such temperature as will allow the dextrine to gradually go over into maltose, and then concentrating the liquor, substantially as described.

7. The process herein described of manufacturing soluble licorice extract, said process consisting in first preparing an infusion of malt, adding said infusion to the liquor until the starch therein is converted into dextrine and maltose, filtering the liquor to remove the coagulated albuminoids and tannin, and finally concentrating the liquor, substantially as described.

In testimony whereof we have signed our names to this specification in the presence of two subscribing witnesses.

SAMUEL P. SADTLER.
JOHN HENRY GRIMM.

Witnesses:
JAMES F. HAGEN,
HENRY HOWSON.